United States Patent
Jahn

(10) Patent No.: US 8,813,359 B2
(45) Date of Patent: Aug. 26, 2014

(54) LEAF SEAL MANUFACTURING METHOD

(71) Applicant: Rolls-Royce PLC, London (GB)

(72) Inventor: Ingo Henry Johannes Jahn, Queensland (AU)

(73) Assignee: Rolls-Royce, PLC, London (GB)

( * ) Notice: Subject to any disclaimer, the term of this patent is extended or adjusted under 35 U.S.C. 154(b) by 0 days.

(21) Appl. No.: 13/644,466

(22) Filed: Oct. 4, 2012

(65) Prior Publication Data
US 2013/0091703 A1 Apr. 18, 2013

(30) Foreign Application Priority Data
Oct. 14, 2011 (GB) .................................. 1117729.2

(51) Int. Cl.
*B21K 25/00* (2006.01)
*F16J 15/32* (2006.01)

(52) U.S. Cl.
CPC .................................. *F16J 15/3292* (2013.01)
USPC .... 29/888.3; 277/355; 415/173.7; 415/174.2; 29/889.2

(58) Field of Classification Search
CPC .............................. F16J 15/3292; F16J 15/447
USPC ............ 29/889.2, 888.3; 277/355; 415/173.7, 415/174.2
See application file for complete search history.

(56) References Cited

U.S. PATENT DOCUMENTS

| | | | |
|---|---|---|---|
| 7,828,297 B2 * | 11/2010 | Hoebel et al. | 277/412 |
| 8,025,296 B2 * | 9/2011 | Uehara et al. | 277/412 |
| 2008/0099999 A1 * | 5/2008 | Williams | 277/355 |
| 2010/0176556 A1 * | 7/2010 | Mack et al. | 277/411 |
| 2010/0213675 A1 * | 8/2010 | Adis et al. | 277/632 |

FOREIGN PATENT DOCUMENTS

| | | |
|---|---|---|
| EP | 0 933 567 A2 | 8/1999 |
| EP | 1 785 648 A2 | 5/2007 |
| EP | 2 123 951 A1 | 11/2009 |
| EP | 2 336 609 A1 | 6/2011 |
| GB | 2481990 A | 1/2012 |

OTHER PUBLICATIONS

Search Report issued in European Application No. 12187103 dated Jan. 8, 2013.
Feb. 13, 2012 British Search Report issued in British Patent Application No. GB1117729.2.

* cited by examiner

*Primary Examiner* — David Bryant
*Assistant Examiner* — Ruth G Hidalgo-Hernande
(74) *Attorney, Agent, or Firm* — Oliff PLC

(57) ABSTRACT

A process is provided for manufacturing leaf seals for effecting seals between coaxial, relatively rotating components. Each leaf seal has an annular pack of leaves which are stacked face-to-face, and are mountable to one of the components at respective root portions of the leaves. The annular pack has a pack radius at the wiping contact edges which is matched within tolerance limits to the radius of the sealing surface. The process includes: determining production parameters for the production of a plurality of leaf seals, the parameters being determined such that at least a portion of the produced leaf seals will have pack radii which violate the tolerance limit; producing the leaf seals using the determined production parameters; and modifying the pack radii of the portion of the produced leaf seals which violate the tolerance limit such that the modified pack radii match the sealing surface within the tolerance limits.

10 Claims, 2 Drawing Sheets

LEAF SEAL MANUFACTURING METHOD

FIELD OF THE INVENTION

The present invention relates to a method for manufacturing leaf seals for effecting seals between coaxial, relatively rotating components.

BACKGROUND OF THE INVENTION

With reference to FIG. 1, a ducted fan gas turbine engine generally indicated at 10 has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Leaf seals are formed from sections of leaf material appropriately presented in order to create a seal surface from juxtaposed leaf edges of respective leaves in an assembly. Typically the leaves are arranged circumferentially about a rotating shaft in order to present the leaf edges and therefore the seal surface towards that shaft in order to provide a seal barrier. Typically, spacer members are provided between each leaf in order to correctly arrange the seal elements for presentation of the leaf edges and therefore the seal surface.

In a gas turbine engine, leaf seals may be used to form a seal between a static component and a rotating component, between two relatively rotating components, or even between two static components in order to maintain a relatively high pressure on one side of the seal and relatively low pressure on the other. FIG. 2, which shows schematically, for example, a cut-away perspective view of a portion of a leaf seal assembly 31 comprises leaves 32 extending from spacer elements 33 secured in a housing comprising a backing ring 34 with coverplates 35. The leaves 32 present leaf edges 36 towards a sealing surface 37 of a rotating component generally rotating in the direction depicted by arrowhead 38. The leaves 32, and in particular the leaf edges 36 of the leaves 32, make wiping contact with the surface 37 in order to create a seal across the assembly 31. Each leaf 32 is generally compliant in order to adjust with rotation and radial and axial movement of the surface 37 to ensure that a good sealing effect is created. The spacers 33 are generally required in order to ensure that flexibility is available to appropriately present the leaves 32 towards the surface 37 which, as illustrated, is generally with an inclined angle between them.

The spacers 33 may be separate components interposed between the root portions of the leaves 32, or they may be formed by folding over extra material at the root portions of the leaves 32. The leaves 32 may be bent e.g. where they meet the spacers 33, to change the angle that the leaves make with the radial direction. By adjusting the spacers 33 between the leaves, and/or by changing the bend angle, the inter-leaf spacing and/or the leaf lay angle can be changed.

Effectively the pack geometry is governed by six parameters (some of which are illustrated in FIG. 3):

Leaf thickness T to inter leaf gap G ratio.

The radius R at which the leaves meet the spacers (often called the "weld radius" as the leaves are typically bonded together by welding, bonding or brazing at this position).

Number of leaves.

Leaf lay angle $\alpha$ (i.e. the angle between the leaf at the weld radius and a radial line).

Leaf length L (i.e. the length of the leaf from the weld radius to the leaf edges making wiping contact)

Leaf axial length.

Other parameters, such as leaf thickness, and radius at the leaf tip, can be calculated once the above values are known.

During seal manufacture it is not possible to achieve the six parameters defining the leaf pack geometry exactly. This can be due to variations in the raw material (e.g. thickness of leaf material) and due to variations that arise during formation processes during the manufacture of the seal (e.g. securing the leaves in the housing, or bending the leaves). Consequently a batch of leaf seals will have a range of seal bore radii (i.e. radii at the leaf edges 36). In a large enough batch, the bore radii are generally normally distributed about the nominal radius.

Due to the range of bore radii, when fitting the seals on a standard size rotor, a number of the seals will have interference (i.e. a seal bore radius smaller than the radius of the sealing surface of the rotor) and will suffer from excessive rub and heat generation which may lead to damage of the rotor and/or the seal. Others seals, however, will operate at a clearance (i.e. a seal bore radius larger than the radius of the sealing surface of the rotor) and will have a poor leakage characteristic as air will leak through the gap. Both these cases are undesirable and may result in seals having to be rejected.

SUMMARY OF THE INVENTION

An aim of the present invention is to improve the efficiency of a leaf seal manufacturing process.

Accordingly, the present invention provides a process of manufacturing leaf seals for effecting seals between coaxial, relatively rotating components, each leaf seal having an annular pack of leaves which are stacked face-to-face within the pack, and which are mountable to one of the components at respective root portions of the leaves such that the leaves extend towards a sealing surface of the other component and respective edges of the leaves are presented for wiping contact with the sealing surface, the annular pack having a pack radius at the wiping contact edges which is matched within tolerance limits to the radius of the sealing surface to prevent, at one extreme, excessive interference of the leaves with the sealing surface and, at the other extreme, insufficient sealing; wherein the process includes the steps of:

(a) determining production parameters for the production of a plurality of leaf seals for use with a seal surface having a given radius, the parameters being determined such that at least a portion of the produced leaf seals will have pack radii which violate the tolerance limit for preventing excessive interference;

(b) producing the leaf seals using the determined production parameters; and (c) modifying the pack radii of the portion of the produced leaf seals which violate the tolerance limit for preventing excessive interference such that the modified pack radii match the sealing surface within the tolerance limits.

By using production parameters which deliberately result in pack radii which cause excessive interference, and then modifying those pack radii to remove the interference, it is possible to improve the overall manufacturing process efficiency. In particular, while accepting that interfering packs will have to be modified, the problem of packs sealing insufficiently can be reduced or eliminated. The additional cost of modifying interfering packs can be outweighed by the saving in rejecting seals with poor leakage characteristics.

Further, because the intention is to deliberately produce in step (b) seal with pack radii that violate the tolerance limit for preventing excessive interference, control on acceptable ranges for variation in materials and formation processes can be relaxed (at least in the direction that leads to excessive interference), also reducing manufacturing costs.

Optional features of the invention will now be set out. These are applicable singly or in any combination with the invention as described above.

Typically, in step (a), the production parameters include any one of, some of, or all of: leaf thickness to inter-leaf gap ratio; weld radius; leaf lay angle; leaf length; and number of leaves. Preferably, the production parameters include at least leaf thickness to inter-leaf gap ratio; weld radius; and leaf lay angle.

Typically, in step (a), the determination is based on an expected population distribution (e.g. a normal distribution) of pack radii, the distribution being in turn a function of the production parameters.

In step (a), the parameters may be determined such that at least 40%, 60% or 80% of the produced leaf seals will have pack radii which violate the tolerance limit for preventing excessive interference.

In step (a), the parameters may be determined such that no more than 5%, 1% or 0.5% of the produced leaf seals will have pack radii which violate the tolerance limit for preventing insufficient sealing.

Preferably, in step (a), the parameters are determined such that substantially all of the produced leaf seals will have pack radii which either (i) match the sealing surface within the tolerance limits, or (ii) violate the tolerance limit for preventing excessive interference.

In step (a), the parameters may be determined such that substantially all of the produced leaf seals will have pack radii which violate the tolerance limit for preventing excessive interference.

In step (a), the parameters may be determined such that substantially all of the produced leaf seals which violate the tolerance limit for preventing excessive interference have pack radii which exceed the tolerance limit for preventing excessive interference by no more than 10%, 5% or 2% of the length of the leaves. In this way, excessive modification (e.g. material removal) in step (c) can be avoided.

In step (c), the pack radii may be modified by removing material from the wiping contact edges of the leaves. For example, this can be accomplished by grinding, abrading, electrical machining, or chemical machining, as appropriate.

The method may include a further step of cleaning the modified seals to remove any debris resulting from the modification procedure.

The method may include a step between steps (b) and (c) of: identifying the portion of the produced leaf seals which have pack radii which violate the tolerance limit for preventing excessive interference. For example, the leaf seals may be identified by fitting to rotors having sealing surfaces with calibrated radii. By assessing contact or rotor torque the pack radius may then be determined. Alternatively, all the produced leaf seals may be exposed to the modification procedure of step (c), although only those leaf seals which have pack radii which violate the tolerance limit for preventing excessive interference will actually be modified by the procedure.

Typically the leaves are mounted to a radially outward component and extend radially inwards from their root portions to the sealing surface of a radially inwards other component. Thus, the pack radius can be the bore (inner) radius of the annular pack, and in step (c) the modification can be to increase the bore radius. However, this is not to exclude the possibility that the leaf pack of the seal can be mounted to a radially inner component and the leaves extend towards a radially outer component. In this case, the pack radius can be the outer radius of the annular pack, and in step (c) the modification can be to decrease the outer radius.

Further optional features of the invention are set out below.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
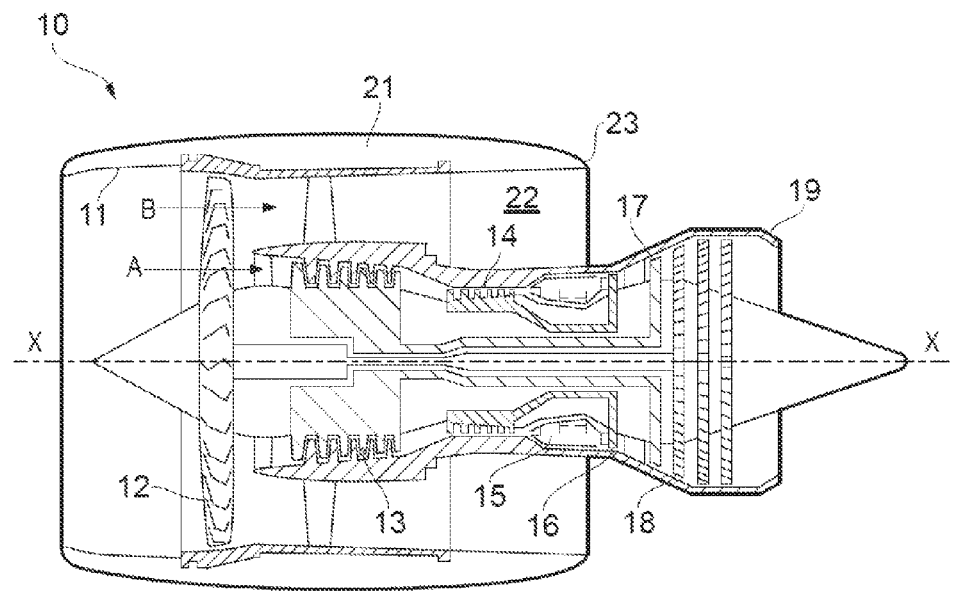
FIG. 1 shows a schematic longitudinal cross-section through a gas turbine engine.
Figure 2:
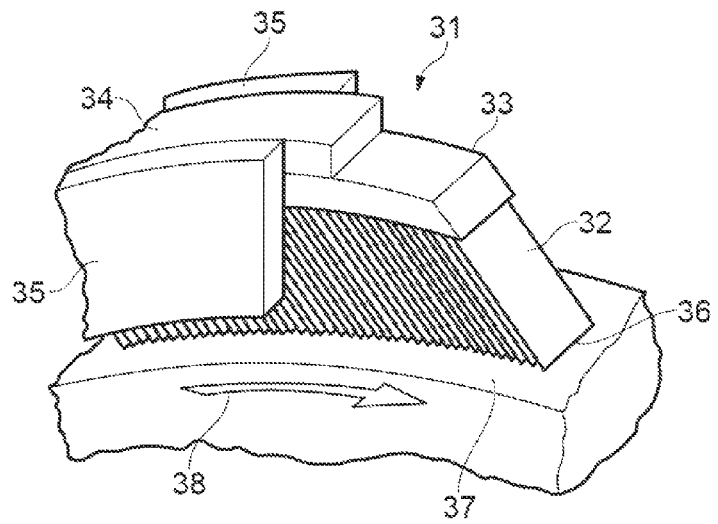
FIG. 2 shows schematically a cut-away perspective view of a portion of a leaf seal assembly.
Figure 3:
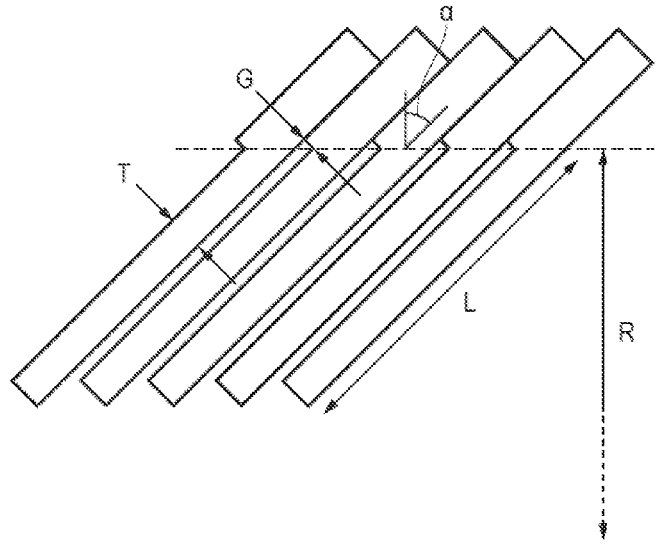
FIG. 3 shows schematically an end-on view of part of the leaf stack of a leaf seal assembly.

The relative impact of the six parameters governing pack geometry on the bore radius of the leaf pack in a seal of the type shown in FIG. 2 is given in the following table, along with the variations typically seen for the parameters.

| Parameter | Impact on bore radius (++++ = strongest) | Typical variation of parameter |
| --- | --- | --- |
| Leaf thickness to inter leaf gap ratio | ++++ | ±5% of standard thickness |
| Leaf lay angle | +++ | ±2-5° |
| Weld radius | ++ | ±0.5 mm (depending on welding method) |
| Leaf length | + | ±0.005 |
| Number of leaves | + | ±5% |
| Leaf axial length | No impact | ±0.005 |

The impact of the input variables on the resulting bore radius can be determined using approaches such as a Monte-Carlo analysis or other methods commonly used in robust design processes. Using such approaches, along with the known statistical variation of the input parameters, allows the statistical variation of the bore radius to be determined.

Hence by adjusting the nominal values of the input parameters, and/or their statistical variations, it is possible to determine parameters for the production of a batch of leaf seals having a desired population distribution of bore radii.

Figure 4:
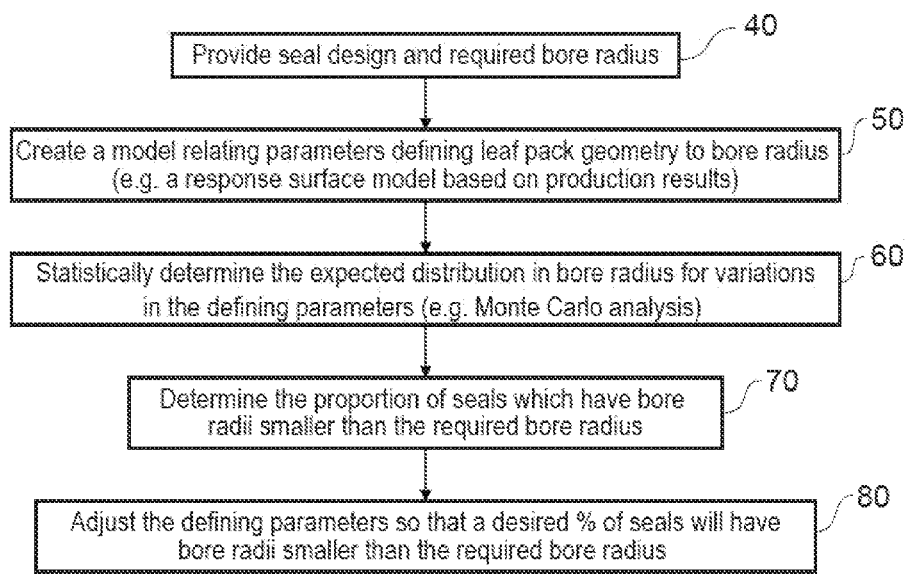
FIG. 4 shows a flow chart indicating stages 40-80 in an approach for determining production parameters.

FIG. 4 shows a flow chart indicating stages 40-80 in an approach for determining production parameters in a method of the present invention. The inputs to the approach, indicated at initial stage 40, are a seal design and a required bore radius. Next, at stage 50, based on manufacturing experience (e.g. if seals of the same design have been manufactured previously) or on analytical models, a relationship between the input parameters from the table above and the bore radius is created. The relationship can be a function along the lines of:

Bore radius=Function(thickness ratio, weld radius, lay angle, leaf length, number of leaves)

At stage 60, the function created in stage 50 is statistically analysed in order to determine the resulting distribution of leaf bore radii that would be expected in a production run based on given values for the input parameters with given statistical variations applied thereto. The distribution is compared (stage 70) to the required bore radius and the number (or proportion) of seals that have an actual bore radius smaller than the required bore radius is determined. The nominal values of the input parameters and/or their statistical variations are then altered and stages 60, 70 and 80 are repeated until a desired portion (or all) of the seals has an actual bore radius smaller than the required bore radius.

Next, leaf seals are produced using the determined parameters. The produced seals having bore radii which are too tight are then subject to a further process which removes material from the leaf bore until the required bore radii is attained. For example, the further process can be bore grinding, electrical machining (e.g. spark erosion—noting that care should be taken to ensure that contacting leaf tips are not bonded together), chemical machining (e.g. etching), or running the seal on an abrasive rotor. However, other processes that remove material from the seal bore in a controlled manner may be adopted. The seals are typically cleaned to remove any debris left over from the material removal procedure.

Advantageously, all the produced seals end up having the correct bore radius independent of the values and variations of the production parameters that define the leaf pack geometry. The number of rejected seals can therefore be reduced. In addition, greater degrees of production parameter variation can be accepted, i.e. tolerance control can be relaxed.

For example, rather than producing seals that achieve a required bore radius (which is challenging due to the close control of tolerances that is required) most or all the seals can be produced so that the actual bore is smaller than the required bore radius. These seals are then subjected to the material removal process until the required bore is achieved. The close tolerance control that would otherwise need to be applied can thus be relaxed, as the final bore is set in the material removal process.

While the invention has been described in conjunction with the exemplary embodiments described above, many equivalent modifications and variations will be apparent to those skilled in the art when given this disclosure. For example, the approach outlined in FIG. 4 is just one of several possible approaches that may be used to determine appropriate production parameters. Accordingly, the exemplary embodiments of the invention set forth above are considered to be illustrative and not limiting. Various changes to the described embodiments may be made without departing from the spirit and scope of the invention.

The invention claimed is:

1. A process of manufacturing leaf seals for effecting seals between coaxial, relatively rotating components, each leaf seal having an annular pack of leaves which are stacked face-to-face within the pack, and which are mountable to one of the components at respective root portions of the leaves such that the leaves extend towards a sealing surface of the other component and respective edges of the leaves are presented for wiping contact with the sealing surface, the annular pack having a pack radius at the wiping contact edges which is matched within tolerance limits to the radius of the sealing surface to prevent, at one extreme, excessive interference of the leaves with the sealing surface and, at the other extreme, insufficient sealing;

wherein the process includes the steps of:
(a) determining production parameters for the production of a plurality of leaf seals for use with a seal surface having a given radius, the parameters being determined such that at least a portion of the produced leaf seals will have pack radii which violate the tolerance limit for preventing excessive interference;
(b) producing the leaf seals using the determined production parameters; and
(c) modifying the pack radii of the portion of the produced leaf seals which violate the tolerance limit for preventing excessive interference such that the modified pack radii match the sealing surface within the tolerance limits.

2. The process according to claim 1, wherein, in step (a), the production parameters include any one of, some of, or all of: leaf thickness to inter-leaf gap ratio; weld radius; leaf lay angle; leaf length; and number of leaves.

3. The process according to claim 1, wherein, in step (a), the determination is based on an expected population distribution of pack radii, the distribution being a function of the production parameters.

4. The process according to claim 1, wherein, in step (a), the parameters are determined such that substantially all of the produced leaf seals will have pack radii which either (i) match the sealing surface within the tolerance limits, or (ii) violate the tolerance limit for preventing excessive interference.

5. The process according to claim 1, wherein, in step (a), the parameters are determined such that substantially all of the produced leaf seals will have pack radii which violate the tolerance limit for preventing excessive interference.

6. The process according to claim 1, wherein, in step (c), the pack radii are modified by removing material from the wiping contact edges of the leaves.

7. The process according to claim 1, wherein the leaves are mounted to a radially outward component and extend radially inwards from their root portions to the sealing surface of a radially inwards other component.

8. The process according to claim 1, wherein in step (a), the determination is based on an expected population distribution of pack radii, the distribution being a function of the production parameters, and wherein the parameters are determined such that substantially all of the produced leaf seals will have pack radii which violate the tolerance limit for preventing excessive interference.

9. The process according to claim 6, wherein the leaves are mounted to a radially outward component and extend radially inwards from their root portions to the sealing surface of a radially inwards other component, such that the pack radius is the bore radius of the annular pack, and wherein step (c) comprises the step of running the leaf seal on an abrasive rotor to increase the bore radius.

10. A process of manufacturing leaf seals for effecting seals between coaxial, relatively rotating components, each leaf seal having an annular pack of leaves which are stacked face-to-face within the pack, and which are mountable to one of the components at respective root portions of the leaves such that the leaves extend towards a sealing surface of the other component and respective edges of the leaves are presented for wiping contact with the sealing surface, the annular pack having a pack radius at the wiping contact edges which is matched within tolerance limits to the radius of the sealing surface to prevent, at one extreme, excessive interference of the leaves with the sealing surface and, at the other extreme, insufficient sealing;

wherein the process includes the steps of:
(a) determining production parameters for the production of a plurality of leaf seals for use with a seal surface having a given radius, the parameters being determined such that at least a portion of the produced leaf seals will have pack radii which violate the tolerance limit for preventing excessive interference;
(b) producing the leaf seals using the determined production parameters; and
(c) modifying the pack radii of the portion of the produced leaf seals which violate the tolerance limit for preventing excessive interference such that the modified pack radii match the sealing surface within the tolerance limits, wherein in step (c), the pack radii are modified by removing material from the wiping contact edges of the leaves and step (c) comprises the step of running the leaf seal on an abrasive rotor to increase the bore radius of the annular pack, in step (a), the determination is based on an expected population distribution pack radii, the distribution being a function of the production parameters, and wherein the parameters are determined such that substantially all of the produced leaf seals will have pack radii which violate the tolerance limit for preventing excessive interference, and the leaves are mounted to a radially outward component and extend radially inwards from their root portions to the sealing surface of a radially inwards other component, such that the pack radius is the bore radius.

* * * * *